United States Patent [19]

Sheu et al.

[11] Patent Number: 5,248,032
[45] Date of Patent: Sep. 28, 1993

[54] COMPACT DISC JACKET

[75] Inventors: Daphne Sheu, Temple City; David France, San Mateo, both of Calif.

[73] Assignee: Ivy Hill Corporation, New York, N.Y.

[21] Appl. No.: 942,644

[22] Filed: Sep. 9, 1992

[51] Int. Cl.⁵ .................................... B65D 85/57
[52] U.S. Cl. .................................... 206/312; 229/87.01
[58] Field of Search ................... 206/307–313, 206/387, 444, 459.5; 229/87.01

[56] References Cited

U.S. PATENT DOCUMENTS

| | | | |
|---|---|---|---|
| 2,189,076 | 2/1940 | Liskin | 206/309 |
| 3,303,603 | 2/1967 | Abeson | 206/312 |
| 3,426,960 | 2/1969 | Shore | 206/312 |
| 3,717,297 | 2/1973 | Perry | 206/312 |
| 4,653,639 | 3/1987 | Traynor | 206/312 |
| 4,694,954 | 9/1987 | Moss | 206/312 |
| 4,709,812 | 12/1987 | Kosterka | 206/311 |
| 4,905,831 | 3/1990 | Bagdis et al. | 206/313 |
| 5,119,933 | 6/1992 | Taylor | 206/313 |

FOREIGN PATENT DOCUMENTS

| | | | |
|---|---|---|---|
| 2141998 | 1/1985 | United Kingdom | 206/444 |
| 2147262 | 5/1985 | United Kingdom | 206/307 |

*Primary Examiner*—Jimmy G. Foster
*Attorney, Agent, or Firm*—Amster, Rothstein & Ebenstein

[57] ABSTRACT

A double-walled paperboard jacket for a compact disc and the like includes a front panel, a back panel, a front inner liner panel, a back inner liner panel, and a pair of glue flaps. One of the front panel ends is contiguous and folded relative to one of the back panel ends, the front inner liner panel is contiguous to and folded relative to the other end of the back panel. Each of the glue flaps is contiguous to and folded relative to an opposed side of the front panel, and each of the glue flaps is glued to the back panel. The front, back and front inner liner panels are of generally the same configuration and dimensions, and the back inner liner panel and the pair of glue flaps are cooperatively configured and dimensioned to define a composite back inner liner panel of generally the same configuration and dimensions as the other panels.

16 Claims, 3 Drawing Sheets

FIG. 2
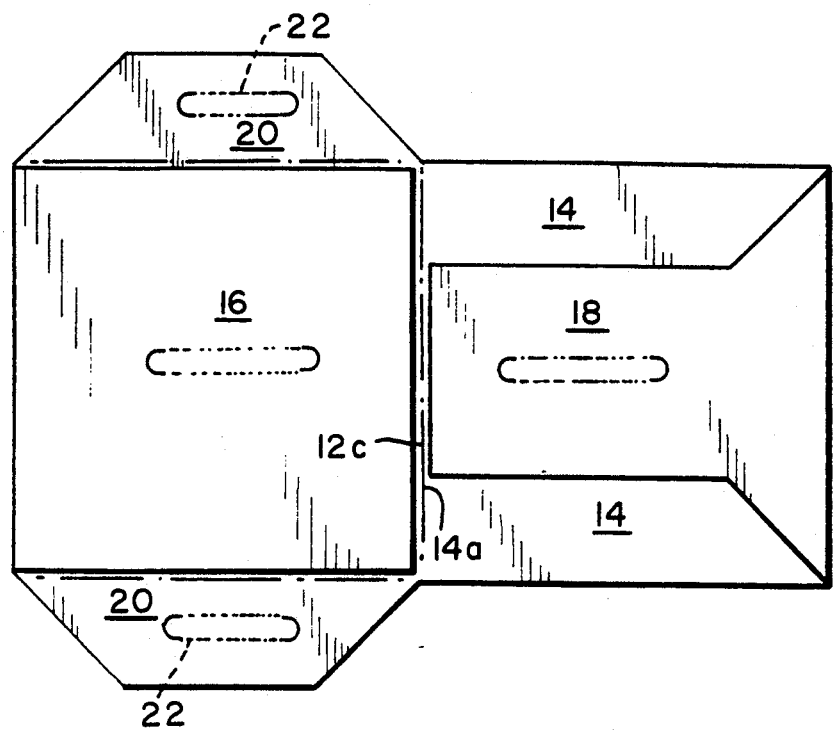
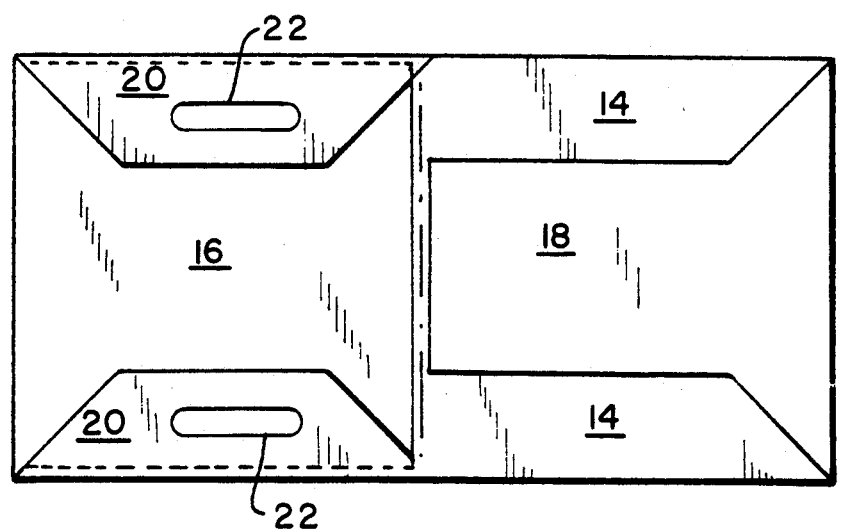
FIG. 3

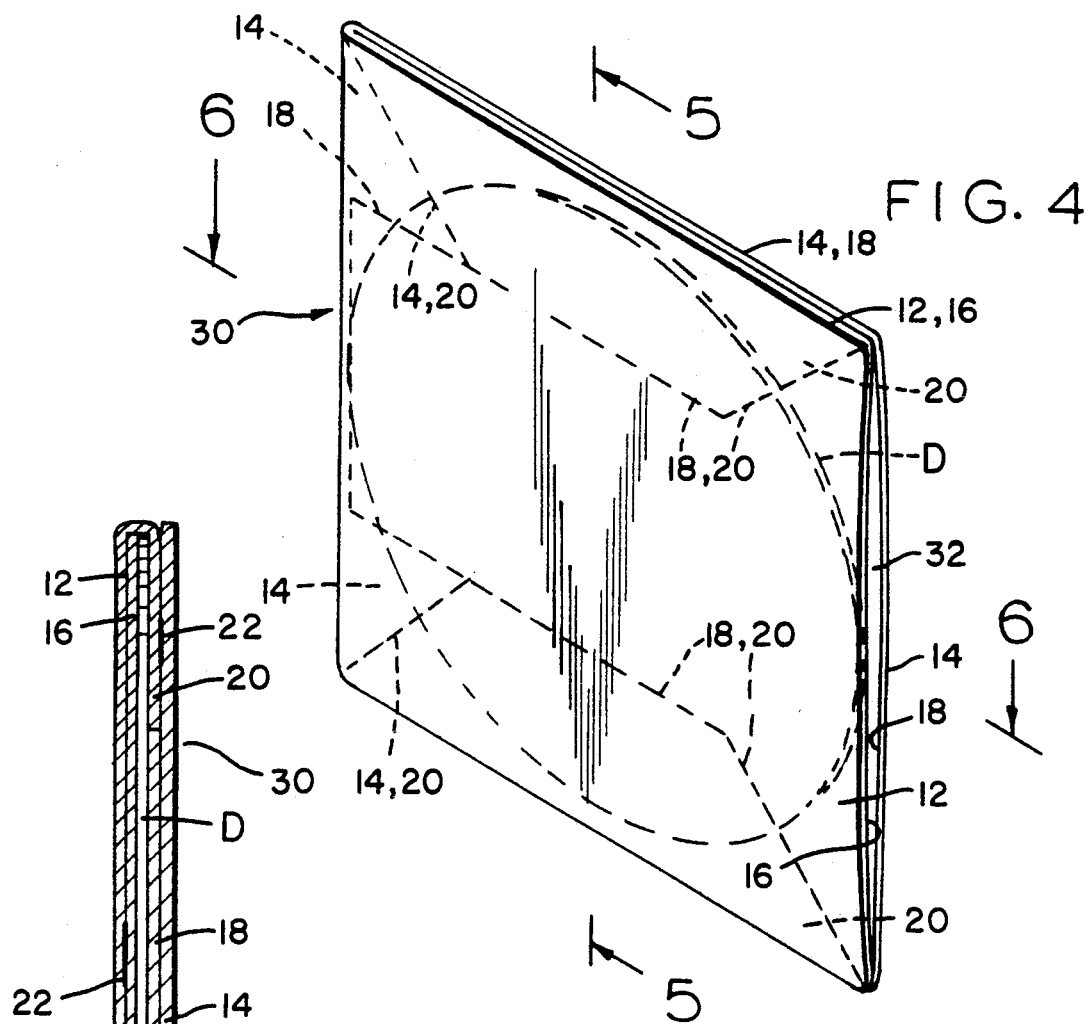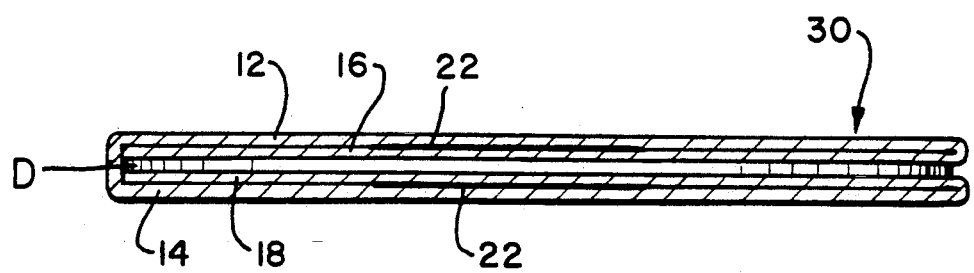

COMPACT DISC JACKET

BACKGROUND OF THE INVENTION

The present invention relates to a compact disc jacket and, more particularly, to a double-walled paperboard jacket for a compact disc and the like as well as a blank from which the same may be made.

Compact discs are now used for a wide variety of different applications ranging from the original application for storing digitally recorded music to its more recent application as a Read-Only Memory (ROM) for computers. The original conventional storage device for the compact disc was a rigid all-plastic box known as a "jewel box." The jewel box has recently been criticized by environmentalists as being nonrecyclable and therefore ecologically unsound. Additionally, the jewel box itself was typically not printable and therefore had to be transparent in order to enable printed matter identifying the nature of the compact disc (perhaps the name of the album recorded, the performers, and the like) to be disposed inside the jewel box in such a way as to be visible therethrough. The jewel box was a rather bulky storage device for home use in view of the thinness of the compact disc being stored, and was not well suited for mailing since it was relatively brittle and therefore had to be protected by cushioning to prevent its fracture during rough handling in the mails.

More recently, compact discs have been sold in storage devices made of paperboard and plastic, this being more ecologically acceptable. Nonetheless, even in these newer storage devices, the paperboard component extending over the plastic holder had to be displaced to permit the compact disc (disposed in a horizontal plane) to be dropped onto the plastic component of the holder.

Compact discs have also been stored in an all-paperboard jacket having a hollow or chamber into which the compact disc was slid edgewise, much as a conventional record is slid into its paperboard sleeve. While such a paperboard jacket had the advantages of being totally recyclable, inexpensive, lightweight, easily mailable, and easily printable, in practice the jackets were not entirely satisfactory. Frequently the jackets were not of double-wall thickness on both sides of the compact disc, so that the jacket lacked the stiffness necessary to protect the surfaces of the compact disc within. Further, typically at least one of the two walls of the jacket did not present to the compact disc a smooth and essentially uninterrupted surface, but rather contained inwardly projecting elements which could interfere with the easy insertion of the compact disc into the hollow or chamber of the jacket. Finally, whereas conventional records played by a needle are necessarily constructed of material having sufficient strength to withstand the "aggressive" or scratchy nature of the uncoated interior of a conventional sleeve, the compact discs are made of softer material (since they are read by a light beam and not by a needle) and therefore less able to withstand the aggressive nature of an uncoated jacket interior. (The term "coating" refers to the "mill coating" of paperboard with clay and binder at the paper mill to improve the fine printability of the paperboard by improving the ink and coating holdout. The term "coating" may also refer to a "press applied coating" of varnish or aqueous latex, which is applied by a printer over printed paperboard in order to seal in the ink layer defining the printing.)

Accordingly, it is an object of the present invention to provide a jacket for compact discs and the like which is substantially double-walled throughout for stiffness.

Another object is to provide such a jacket which presents a chamber or hollow with an essentially smooth interior to prevent hang-up of a compact disc therein during the insertion and removal processes.

Yet another object is to provide such a jacket which is 100% recyclable, inexpensive, lightweight, mailable without cushioning, and printable on its exterior surfaces.

A further object is to provide a paperboard blank, which is mill coated on only one side thereof, from which such a jacket may be made.

SUMMARY OF THE INVENTION

It has now been found that the above and related objects of the present invention are obtained in a blank for a double-walled paperboard jacket for a compact disc and the like. The blank comprises a front panel and a back panel, each having a pair of opposed sides and a pair of opposed ends. One of the front panel ends is contiguous to one of the back panel ends. The blank also comprises a front inner liner panel contiguous to the other of the opposed ends of the front panel, and a back inner liner panel contiguous to the other of the opposed ends of the back panel. Finally, the blank comprises a pair of glue flaps, each of the glue flaps being contiguous to an opposed side of the front panel. The front, back and front inner liner panels are of generally the same configuration and dimensions, and the back inner liner panel and the pair of glue flaps are cooperatively configured and dimensioned to define a composite back inner liner panel of generally the same configuration and dimensions as the other panels when the panels and glue flaps are appropriately folded relative to one another and the glue flaps are glued to the back panel.

Preferably the blank is coated for printing on only one face thereof, and the back inner liner panel has a free end of reduced width.

The invention also encompasses a double-walled paperboard jacket for a compact disc and the like, made from such a blank. The jacket comprises front and back panels, each having a pair of opposed sides and a pair of opposed ends. One of the front panel ends is contiguous to and folded relative to one of the back panel ends. A front inner liner panel is contiguous to and folded relative to the other of the opposed ends of the front panel, and a back inner liner panel is contiguous to and folded relative to the other of the opposed ends of the back panel. Each of a pair of glue flaps is contiguous to and folded relative to an opposed side of the front panel, each of the glue flaps also being glued to the back panel. The front, back and front inner liner panels are of generally the same configuration and dimensions, and the back inner liner panel and the pair of glue flaps are cooperatively configured and dimensioned to define a composite back inner liner panel of generally the same configuration and dimensions as the other panels.

In a preferred embodiment, the jacket is formed substantially exclusively of paperboard and defines a chamber intermediate the front inner liner panel and the composite back inner liner panel. The sides of the jacket are closed by the fold between each of the glue flaps and the front panel, one of the ends of the jacket is closed by the fold between the front and back panels, and the other of the ends of the jacket defines an aperture for passage of a compact disc and the like therethrough into or from the chamber. Each of the panels defines a pair of opposed faces, one face of the front inner liner panel being glued to an adjacent face of the front panel, and one face of the back inner liner panel being glued to an adjacent face of the back panel. Each of the glue flaps is glued to the adjacent face of the back panel on an opposite side of the back inner liner panel. The back inner liner panel has a portion of reduced width disposed intermediate the glue flaps.

Preferably, the jacket is double-walled substantially throughout and is formed from a paperboard blank coated on only one surface thereof, all exterior surfaces of the jacket and substantially all interior surfaces of the chamber being coated. More particularly, all of the interior surfaces of the chamber defined by the front panel and the back inner liner panel are coated. All of the panels and glue flaps are together of one-piece, unitary, integral construction.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIGS. 2 and 3 are front elevational views thereof in progressive stages of folding to form the jacket;

FIG. 4 is an isometric view of a complete jacket made from the blank by folding and gluing, with a compact disc being illustrated therein; and FIGS. 5 and 6 are sectional views taken along the lines 5—5 and 6—6, respectively, of FIG. 4.

DETAILED DESCRIPTION OF THE PREFERRED EMBODIMENTS

Figure 1:
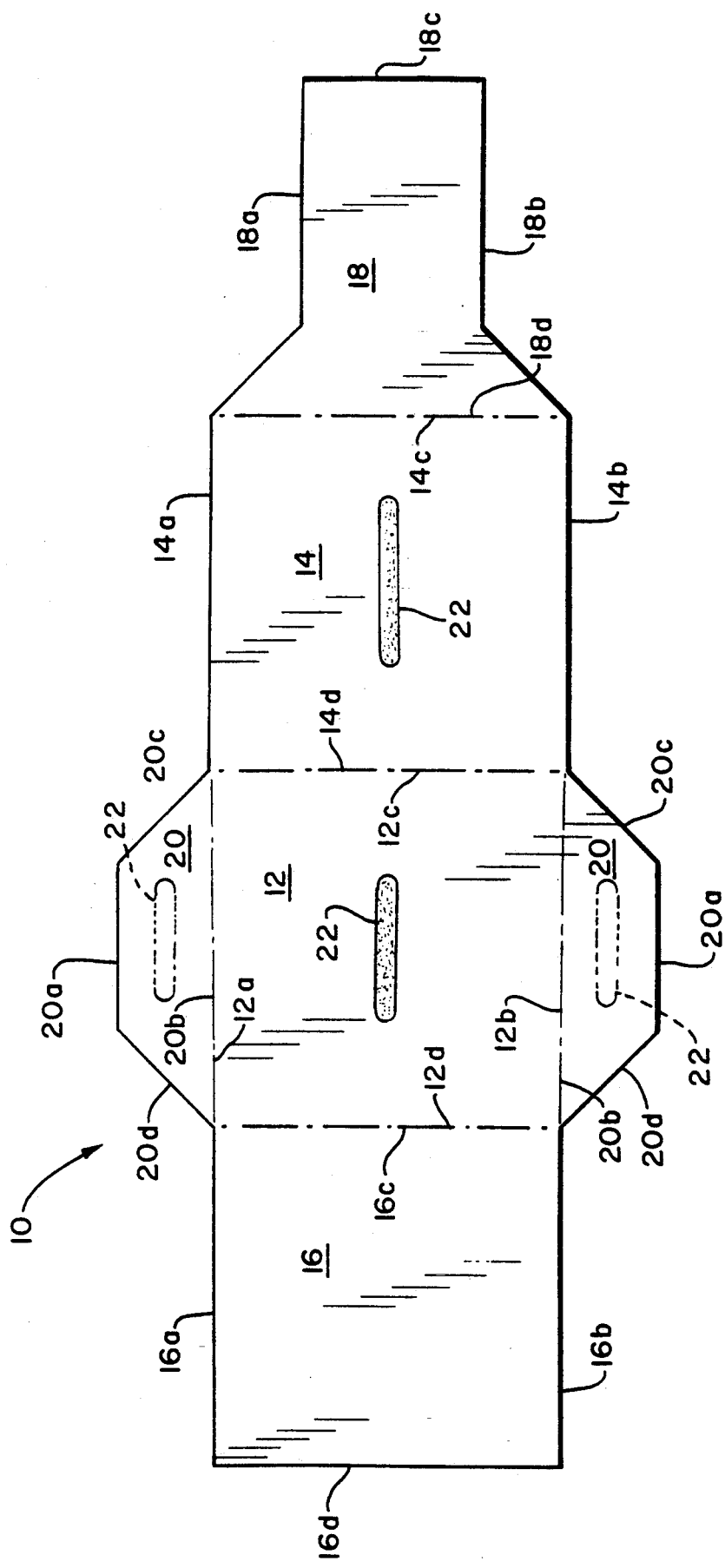
FIG. 1 is a front elevational view of a blank according to the present invention.

Referring now to the drawing and in particular to FIG. 1 thereof, therein illustrated is a paperboard blank according to the present invention, generally designated by the reference numeral 10. The blank 10 comprises a front panel 12 having a pair of opposed sides 12a, 12b and a pair of opposed ends 12c, 12d, and a back panel 14 having a pair of opposed sides 14a, 14b and a pair of opposed ends 14c, 14d. The front panel end 12c is contiguous to the back panel end 14d, the two ends 12c, 14d actually defining a foldline 12c, 14d between the front and back panels 12, 14. A front inner liner panel 16 has a pair of opposed sides 16a, 16b and a pair of opposed ends 16c, 16d, with the front inner liner panel end 16c being contiguous to the front panel end 12d, the ends 12d, 16c defining a fold line 12d, 16c. A back inner liner panel 18 has a pair of opposed sides 18a, 18b and a pair of opposed ends 18c, 18d, the back inner liner panel end 18d being contiguous to the back panel end 14c, the ends 18d, 14c in fact defining a foldline 14c, 18d. The blank 10 additionally includes a pair of glue flaps 20, each of the glue flaps 20 having a pair of opposed sides 20a, 20b and a pair of opposed ends 20c, 20d, the glue flap sides 20b being contiguous to respective opposed front panel sides 12a, 12b.

The front panel 12, the back panel 14, and the front inner liner panel 16 are of generally the same configuration and dimensions. Generally these panels 12, 14, 16 are rectangular (preferably square) and of slightly larger dimensions than the compact disc to be received in the jacket made from the blank 10. As best seen in FIG. 4, when the panels 12, 14, 16, 18 and glue flaps 20 are appropriately folded relative to one another, and the glue flaps 20 are glued to the back panel 14, the back inner liner panel 18 and the pair of glue flaps 20 are cooperatively configured and dimensioned to define a composite back inner liner panel of generally the same configuration and dimensions as the other panels 12, 14, 16. More particularly, composite back inner liner panel has generally the same configuration and dimensions as the other panels 12, 14, 16 except for one edge 18c thereof where small corner portions 18a, 20a and 18b, 20b are missing.

As the front inner liner panel 16 will be folded over and glued to the front panel 12 in the final product, a region 22 of glue (for example, a hot-melt adhesive) is illustrated in the center of front panel 12, although the region 22 may be located elsewhere on the front panel 12, and indeed on front inner liner panel 16 alternatively or in addition thereto. As the back inner liner panel 18 will be folded over the back panel 14 in the final product, a region 22 of glue (for example, a hot-melt adhesive) is illustrated in the center of back panel 14, although the region 22 may be located elsewhere on the back panel 14, and indeed on back inner liner panel 18 alternatively or in addition thereto. As the glue flaps 20 will be folded over (but not glued to) the front panel 12 in the final product, and will be glued to the back panel 14 adjacent the sides 14a, 14b thereof in the final product, a region 22 of glue (for example, hot-melt adhesive) is illustrated in the center of the reverse side of each glue flap 20, although the region 22 may be located elsewhere on the reverse side of the glue flaps 20, and alternatively or additionally on the rear panel 14 adjacent the sides 14a, 14b thereof.

Referring now to FIG. 2, therein illustrated is the blank 10 after the front inner liner panel 16 has been folded over the front panel 12 (along the foldline 12d, 16c) and glued thereto, and after the back inner liner panel 18 has been folded over the back panel 14 (along the foldline 14c, 18d) and glued thereto.

Referring now to FIG. 3, therein illustrated is the blank 10 after the glue flaps 20 have been folded over the front inner liner panel 16 (along foldlines 12a, 20b and 12b, 20b, respectively). At this point, the regions 22 of glue on glue flaps 20 are visible.

Referring now to FIGS. 4-6, therein illustrated is a jacket 30 according to the present invention. The jacket 30 is made from the folded blank of FIG. 3 by folding one half of the blank (containing front panel 12, front inner liner panel 16 and the glue flaps 20) over the other half of the blank (containing back panel 14 and back inner liner panel 18) along the foldline 12c, 14d. A compact disc D is illustrated within a hollow or chamber 32 defined by the jacket 30 intermediate the front inner liner panel 16 and the composite back inner liner panel defined by the back inner liner panel 18, the glue flaps 20 and optionally minor portions of the back panel 14. The sides of the jacket 30 are closed by the fold 12a, 20b between each of the glue flaps 20 and the front panel 12. One of the ends of the jacket 30 is closed by the fold 12c, 14d between the front and back panels 12, 14, and the other of the ends of the jacket 30 defines an aperture for passage of a compact disc D and the like therethrough into or from the chamber 32. It will be appreciated that each of the glue flaps 20 is glued to an adjacent face of the back panel 14 on an opposite side 18a, 18b of the back inner liner panel 18. To this end, the back inner liner panel 18 has a portion of reduced width disposed intermediate the glue flaps 20, that portion being the free end of the back inner liner panel 18 illustrated in FIG. 1.

As illustrated in FIG. 1, the glue flaps 20 are trapezoidal in configuration, with the sides 20c, 20d thereof being of equal length, and the back inner liner panel 18 has its sides 18a, 18b converging from the foldline 14c, 18d into a portion of reduced width terminating in free end 18c. As a result, the composite back inner liner panel of the jacket 30 essentially covers the adjacent surface of the back panel 14, but not completely as the triangular corners of the back panel 14 are exposed and define a part of the chamber 32 (each triangular corner being defined in part by a side 14a or 14b and an end 14d). If desired, this situation can be avoided either by having the glue flaps 20 define right angle trapezoids (that is, trapezoids wherein the angles formed by the flap end 20c define right angles with the flap sides 20a, 20b, and the flap end 20c is aligned with the foldline 12c, 14d), or by having the portion of the back inner liner panel 18 with a free end 18c which is configured and dimensional as a mirror image of the other end 18d (so that there are two) converging end portions separated by a portion of reduced width therebetween). With either of these modifications, the composite back inner liner panel is formed exclusively of the back inner liner panel 18 and the glue flaps 20. This produces a jacket which is 100% double-walled so that both surfaces of the compact disc D therewithin are fully protected. However, as a general matter, such a modification is not required since, as best illustrated in FIG. 4, in the basic design there is essentially 100% double-walled thickness and only a very minor segment of the compact disc D is not protected by a double-walled thickness on both sides.

As the jacket 30 is made exclusively of paperboard, it is inexpensive, 100% recyclable, lightweight, and safely mailable without cushioning, while at the same time providing a desirable thickness and stiffness resulting from its 100% double-walled thickness on one side and its essentially full double-walled thickness on the other side.

Referring back to FIG. 1, the blank 10 is of unitary, one-piece, integral construction—in other words, a single sheet of paperboard cut to the desired shape. The blank 10 is typically mill coated for printing (typically with clay and binders in order to provide fine printability) on only one face thereof—namely, the face hidden in FIG. 1. The blank may, of course, also be printed, and, if printed, may also contain a press-applied coating of varnish or aqueous latex disposed over the print in order to seal in the ink layer. Accordingly, in the finished product, all of the exterior surfaces of the jacket 30 and substantially all interior surfaces of the chamber 32 are coated. The only interior surfaces of the chamber 32 which are not coated are those defined by the glue flaps 20 and (assuming the modifications discussed above have not been made) the triangular corners of the back panel 14 defined in part by the sides 14a, 14b and the end 14d. If the modifications suggested above have been made, the only interior surface of the chamber 32 which is uncoated is that defined by the glue flaps 20. In either case, all of the normally visible surfaces of the jacket 32 (including any portions of the interior thereof normally visible during the insertion and removal process) are coated—i.e., either mill coated or mill coated, printed and press-coated.

As the interior surfaces of the chamber 32 which have been coated are less "aggressive" or scratchy to the compact disc, this arrangement minimizes wear of the compact disc as it is repeatedly inserted into and removed from the jacket 30. At present, as compact discs are presently played on only one side, and as one entire surface of the chamber 32 (that is, the surface defined by the front inner liner panel 16) is completely coated, appropriate instructions may be provided to the user so that the compact disc D is inserted into the jacket 30 in such a manner that the more sensitive surface of the compact disc D encounters only the totally coated side 16 of the chamber 32.

Referring now to FIG. 4, it will be appreciated that the compact disc D can be easily slid into or out of the chamber 32 of jacket 30 without fear of the compact disc becoming hung up on the glue flaps 20 (that is, without the glue flaps blocking insertion of the compact disc into the chamber 32) since the glue flaps 20 and the back inner liner panel 18 are in the same plane, as best seen in FIG. 5. Thus the four intersection lines 18, 20 illustrated in FIG. 4 present no impediment to the insertion of the compact disc into the chamber 32 because the elements 18 and 20 are disposed within the same plane. Further, the two intersection lines 14, 20 of FIG. 4 present no impediment to the removal of the compact disc D from the chamber 32, despite the nonplanarity of the elements 14, 20, since the disc is already abutted by the innermost element (namely, the glue flaps 20).

To summarize, the present invention provide a jacket for compact discs and the like which is substantially double-walled throughout for stiffness and yet presents a chamber with an essentially smooth interior in order to avoid hang-up of a compact disc therein during the insertion or removal process. The jacket is 100% recyclable, inexpensive, lightweight, mailable without cushioning, and printable on its exterior surfaces. The present invention furthermore provides a paperboard blank, which is coated on only one side thereof, from which such a jacket may be made.

Now that the preferred embodiments of the present embodiment have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A paperboard blank for a double-walled jacket for a recording medium, comprising:
    (A) a front panel having a pair of opposed sides and a pair of opposed ends;
    (B) a back panel having a pair of opposed sides and a pair of opposed ends, one of said front panel ends being contiguous to one of said back panel ends;
    (C) a front inner liner panel contiguous to the other of said opposed ends of said front panel;
    (D) a back inner liner panel contiguous to the other of said opposed ends of said back penal; and
    (E) a pair of glue flaps, each of said glue flaps being contiguous to an opposed side of said front panel;
    said front, back and front inner liner panels being of generally the same configuration and dimensions, and said back inner liner panel and said pair of glue flaps being cooperatively configured and dimensioned to define a coplanar composite back inner liner panel of generally the same configuration and dimensions as the other panels on all but one edge thereof when said panels and glue flaps are appropriately folded relative to one another and said glue flaps are glued to said back panel.

2. The blank of claim 1 wherein said blank is coated for printing on only one face thereof.

3. The blank of claim 1 wherein said back inner liner panel has a free end of reduced width.

4. A paperboard blank for a double-walled jacket for a compact disc, comprising:
   (A) a front panel having a pair of opposed sides and a pair of opposed ends;
   (B) a back panel having a pair of opposed sides and a pair of opposed ends, one of said front panel ends being contiguous to one of said back panel ends;
   (C) a front inner liner panel contiguous to the other of said opposed ends of said front panel;
   (D) a back inner liner panel contiguous to the other of said opposed ends of said back panel and having a free end of reduced width; and
   (E) a pair of glue flaps, each of said glue flaps being contiguous to an opposed side of said front panel;
   said front, back and front inner liner panels being of generally the same configuration and dimensions, and said back inner liner panel and said pair of glue flaps being cooperatively configured and dimensioned to define a coplanar composite back inner liner panel of generally the same configuration and dimensions as the other panels on all but one edge thereof when said panels and glue flaps are appropriately folded relative to one another and said glue flaps are glued to said back panel;
   said blank being coated for printing on only one face thereof.

5. A double-walled paperboard jacket for a recording medium, comprising:
   (A) a front panel having a pair of opposed sides and a pair of opposed ends;
   (B) a back panel having a pair of opposed sides and a pair of opposed ends, one of said front panel ends being contiguous to and folded relative to one of said back panel ends;
   (C) a front inner liner panel contiguous to and folded relative to the other of said opposed ends of said front panel;
   (D) a back inner liner panel contiguous to and folded relative to the other of said opposed ends of said back panel; and
   (E) a pair of glue flaps, each of said glue flaps being contiguous to and folded relative to an opposed side of said front panel, and each of said glue flaps being glued to said back panel;
   said front, back and front inner liner panels being of generally the same configuration and dimensions, and said back inner liner panel and said pair of glue flaps being cooperatively configured and dimensioned to define a coplanar composite back inner liner panel of generally the same configuration and dimensions as the other panels on all but one edge thereof.

6. The jacket of claim 5 wherein said jacket is formed substantially exclusively of paperboard.

7. The jacket of claim 5 wherein said jacket defines a chamber intermediate said front inner liner panel and said composite back inner liner panel.

8. The jacket of claim 7 wherein the sides of said jacket are closed by the fold between each of said glue flaps and said front panel, one of the ends of said jacket is closed by the fold between said front and back panels, and the other of the ends of said jacket defines an aperture for passage of a compact disc and the like therethrough into or from said chamber.

9. The jacket of claim 5 wherein each of said panels defines a pair of opposed faces, one face of said front inner liner panel being glued to an adjacent face of said front panel, and one face of said back inner liner panel being glued to an adjacent face of said back panel.

10. The jacket of claim 9 wherein each of said glue flaps is glued to said adjacent face of said back panel on an opposite side of said back inner liner panel.

11. The jacket of claim 10 wherein said back inner liner panel has a portion of reduced width disposed intermediate said glue flaps.

12. The jacket of claim 5 wherein said jacket is double-walled substantially throughout.

13. The jacket of claim 5 wherein said jacket defines a chamber intermediate said front inner liner panel and said composite back inner liner panel and is formed from a paperboard blank coated on only one surface thereof, and all exterior surfaces of said jacket and substantially all interior surfaces of said chamber are coated.

14. The jacket of claim 13 wherein the interior surfaces of said chamber defined by said front panel and said back inner liner panel are coated.

15. The jacket of claim 5 wherein all of said panels and glue flaps are together of one-piece, unitary, integral construction.

16. A double-walled paperboard jacket for a compact disc, comprising:
   (A) a front panel having a pair of opposed faces, a pair of opposed sides, and a pair of opposed ends;
   (B) a back panel having a pair of opposed faces, a pair of opposed sides, and a pair of opposed ends, one of said front panel ends being contiguous to and folded relative to one of said back panel ends;
   (C) a front inner liner panel having a pair of opposed faces, contiguous to and folded relative to the other of said opposed ends of said front panel;
   (D) a back inner liner panel having a pair of opposed faces, contiguous to and folded relative to the other of said opposed ends of said back panel; and
   (E) a pair of glue flaps, each of said glue flaps being contiguous to and folded relative to an opposed side of said front panel, and each of said glue flaps being glued to said back panel;
   said front, back and front inner liner panels being of generally the same configuration and dimensions, and said back inner liner panel and said pair of glue flaps being cooperatively configured and dimensioned to define a coplanar composite back inner liner panel of generally the same configuration and dimensions as the other panels on all but one edge thereof;
   said jacket being formed substantially exclusively of paperboard and defining a pair of opposed sides, a pair of opposed ends and a chamber intermediate said front inner liner panel and said composite back inner liner panel; the sides of said jacket being closed by the fold between each of said glue flaps and said front panel, one of the ends of said jacket being closed by the fold between said front and back panels, and the other of the ends of said jacket defining an aperture for passage of a compact disc and the like therethrough into or from said chamber; one face of said front inner liner panel being glued to an adjacent face of said front panel, and one face of said back inner liner panel being glued to an adjacent face of said back panel, each of said glue flaps being glued to said adjacent face of said back panel on a respective side of said back inner liner panel, and said back inner liner panel having a portion of reduced width disposed intermediate said glue flaps;

said jacket being double-walled substantially throughout and formed from a paperboard blank coated on only one surface thereof, all exterior surfaces of said jacket and substantially all interior surfaces of said chamber being coated;

all of said panels and glue flaps being together of one-piece, unitary, integral construction.

* * * * *

UNITED STATES PATENT AND TRADEMARK OFFICE
CERTIFICATE OF CORRECTION

PATENT NO. : 5,248,032

DATED : September 28, 1993

INVENTOR(S) : Daphne Sheu, et al.

It is certified that error appears in the above-identified patent and that said Letters Patent is hereby corrected as shown below:

On title page, item [73], line 2, after

"N.Y." add --and Apple Computer, Inc., Cupertino, CA.--

Signed and Sealed this

Sixteenth Day of May, 1995

*Attest:*

BRUCE LEHMAN

*Attesting Officer*     *Commissioner of Patents and Trademarks*